United States Patent
Casagrande (10) Patent No.: US 10,112,360 B2
(45) Date of Patent: Oct. 30, 2018

(54) APPARATUS FOR SUPPORTING A PORTABLE DEVICE FOR SEAT BACK VIEWING

(71) Applicant: Gregory Casagrande, Bradenton, FL (US)

(72) Inventor: Gregory Casagrande, Bradenton, FL (US)

( * ) Notice: Subject to any disclaimer, the term of this patent is extended or adjusted under 35 U.S.C. 154(b) by 0 days.

(21) Appl. No.: 14/456,481

(22) Filed: Aug. 11, 2014

(65) Prior Publication Data

US 2016/0039349 A1 Feb. 11, 2016

(51) Int. Cl.
| | | |
|---|---|---|
| *A47F 5/10* | (2006.01) |
| *B65D 5/44* | (2006.01) |
| *B60R 11/02* | (2006.01) |
| *B31F 5/00* | (2006.01) |
| *G06F 1/16* | (2006.01) |
| *B60N 3/00* | (2006.01) |
| *B60R 7/04* | (2006.01) |
| *B64D 11/06* | (2006.01) |
| *B60R 11/00* | (2006.01) |
| *A47F 5/11* | (2006.01) |

(52) U.S. Cl.
CPC .............. *B31F 5/005* (2013.01); *B60N 3/004* (2013.01); *B60R 7/043* (2013.01); *B60R 11/0235* (2013.01); *B60R 11/0252* (2013.01); *B64D 11/0638* (2014.12); *G06F 1/166* (2013.01); *G06F 1/1626* (2013.01); *G06F 1/1633* (2013.01); *A47F 5/112* (2013.01); *B60R 2011/0015* (2013.01); *B60R 2011/0075* (2013.01)

(58) Field of Classification Search
CPC ... B06R 7/08; B06R 11/0252; B06R 11/0229; B06R 2011/0015; B05N 3/004; B31F 5/005; G06F 1/1626; G06F 1/1633
USPC .... 248/441.1, 447, 448, 454, 455, 459, 460, 248/463, 465, 462
See application file for complete search history.

(56) References Cited

U.S. PATENT DOCUMENTS

| | | | | |
|---|---|---|---|---|
| 812,993 | A * | 2/1906 | Harper ................. | A47B 23/042 248/459 |
| 1,189,531 | A * | 7/1916 | Beirwirth ............. | B65D 5/5206 206/45.24 |
| 1,563,687 | A * | 12/1925 | Chaney ................ | A47F 5/112 206/45.26 |
| 2,515,887 | A * | 7/1950 | Moore ................. | B65D 5/5206 206/45.26 |
| 2,553,174 | A * | 5/1951 | Cross .................. | A47G 1/141 248/459 |
| 2,783,013 | A * | 2/1957 | Williamson ......... | B65D 5/5206 206/45.25 |
| 4,311,233 | A * | 1/1982 | Austin ................. | B65D 5/5206 206/45.21 |

(Continued)

FOREIGN PATENT DOCUMENTS

WO    WO 2007123615 A1 * 11/2007 ........... A47B 23/043

*Primary Examiner* — Joshua J Michener
*Assistant Examiner* — Kyle J. Walraed-Sullivan
(74) *Attorney, Agent, or Firm* — C. John Brannon; Brannon Sowers & Cracraft PC (57) ABSTRACT

An apparatus for supporting a tablet for seatback viewing, including a generally flat tablet engaging portion, a generally flat seat engaging portion extending therefrom; and a support shelf operationally connected to tablet engaging portion.

11 Claims, 10 Drawing Sheets

(56) References Cited

U.S. PATENT DOCUMENTS

| | | | | |
|---|---|---|---|---|
| 4,512,541 A * | 4/1985 | Lietzke | A47F 5/112 | 206/45.25 |
| 4,579,232 A * | 4/1986 | Fedak | A47F 5/112 | 206/45.25 |
| 4,819,792 A * | 4/1989 | Christian | B65D 5/5206 | 206/45.25 |
| 5,029,797 A * | 7/1991 | Levorchick | A63F 1/10 | 248/459 |
| 5,083,663 A * | 1/1992 | Conway | B65D 5/5206 | 206/45.26 |
| 5,150,813 A * | 9/1992 | Harris | A47F 7/147 | 206/45.26 |
| 5,165,649 A * | 11/1992 | Neumann | A47B 23/044 | 206/45.26 |
| 5,226,576 A * | 7/1993 | Ellsworth | B60R 7/043 | 224/275 |
| 5,277,388 A * | 1/1994 | Denaro | A47F 5/112 | 206/45.25 |
| 5,301,800 A * | 4/1994 | Kenney | A47F 7/147 | 206/449 |
| 5,305,875 A * | 4/1994 | Meyer | A47F 7/147 | 206/45.25 |
| 5,351,882 A * | 10/1994 | Krautsack | B65D 5/4208 | 206/45.26 |
| 5,664,676 A * | 9/1997 | Levins | A45C 9/00 | 206/424 |
| 5,941,496 A * | 8/1999 | Banner | A47B 23/004 | 248/459 |
| 6,030,034 A * | 2/2000 | Plohetski | A47C 7/383 | 297/188.06 |
| 6,070,744 A * | 6/2000 | Levinson | G09F 3/20 | 211/50 |
| 6,105,839 A * | 8/2000 | Bell | B60N 3/004 | 220/6 |
| 6,142,322 A * | 11/2000 | Smith | A47F 5/0869 | 211/183 |
| 6,189,248 B1 * | 2/2001 | Nagel | G09F 3/204 | 248/222.51 |
| 6,220,555 B1 * | 4/2001 | Chase | A47F 5/112 | 248/174 |
| 6,237,887 B1 * | 5/2001 | Banner | A47B 23/004 | 248/459 |
| 6,367,752 B1 * | 4/2002 | Forsythe | G09F 15/02 | 248/220.21 |
| 6,470,613 B1 * | 10/2002 | Wildrick | G09F 3/20 | 40/649 |
| 6,557,897 B1 * | 5/2003 | Gaudet | A47B 23/044 | 248/455 |
| 6,557,899 B2 * | 5/2003 | Martin-Cocher | F16L 37/0985 | 285/305 |
| 6,672,549 B2 * | 1/2004 | Kolb | B60R 11/0241 | 248/127 |
| 6,698,701 B1 * | 3/2004 | Dalton | A47F 5/0869 | 248/222.12 |
| 6,929,117 B1 * | 8/2005 | Cohen | A47F 5/112 | 206/425 |
| 7,185,869 B2 * | 3/2007 | Smith | A47B 23/044 | 248/456 |
| 7,191,926 B1 * | 3/2007 | Costantino | A45C 3/02 | 190/102 |
| 7,561,415 B2 * | 7/2009 | Liou | G02F 1/1323 | 349/58 |
| 7,676,969 B2 * | 3/2010 | Davis | G09F 1/06 | 248/174 |
| 8,136,677 B2 * | 3/2012 | Brozak | A47F 7/147 | 211/50 |
| 8,292,095 B2 * | 10/2012 | Howlett | A47F 5/112 | 211/126.16 |
| 9,051,087 B1 * | 6/2015 | Daniels | B65D 33/00 | |
| 9,308,767 B1 * | 4/2016 | Waldron | B42D 15/042 | |
| 9,445,672 B2 * | 9/2016 | Demosthene | A47C 7/62 | |
| 2002/0130227 A1 * | 9/2002 | Kolb | B60R 11/0241 | 248/127 |
| 2004/0026966 A1 * | 2/2004 | Albersen | B60N 2/6081 | 297/188.06 |
| 2004/0188299 A1 * | 9/2004 | Vaira | A45F 5/12 | 206/424 |
| 2004/0245413 A1 * | 12/2004 | Dempsey | A47F 5/112 | 248/150 |
| 2008/0067301 A1 * | 3/2008 | Moss | A47F 5/112 | 248/174 |
| 2008/0230672 A1 * | 9/2008 | Pachowski | A47B 23/044 | 248/453 |
| 2009/0073337 A1 * | 3/2009 | Liou | G02F 1/1323 | 349/58 |
| 2009/0188881 A1 * | 7/2009 | Travis | A45C 13/02 | 211/131.1 |
| 2010/0258602 A1 | 10/2010 | Amin | | |
| 2011/0204112 A1 * | 8/2011 | Crandall | B60R 11/02 | 224/572 |
| 2012/0241572 A1 | 1/2012 | McLain et al. | | |
| 2012/0146466 A1 * | 6/2012 | Lu | A45C 7/0036 | 312/223.1 |
| 2012/0280014 A1 * | 11/2012 | Lopez-Apodaca | B60R 11/0241 | 224/539 |
| 2012/0298550 A1 * | 11/2012 | Martin | A47F 5/0025 | 206/775 |
| 2013/0026329 A1 * | 1/2013 | Lane | A47B 23/043 | 248/459 |
| 2015/0065211 A1 * | 3/2015 | Won | B60R 11/02 | 455/575.9 |
| 2015/0122159 A1 * | 5/2015 | Valcic | B64D 11/0636 | 108/26 |
| 2015/0123433 A1 * | 5/2015 | Lamb, Jr. | B60R 11/0229 | 297/188.05 |
| 2016/0121772 A1 * | 5/2016 | Stecko | B60N 3/002 | 108/25 |
| 2016/0143435 A1 * | 5/2016 | Kim | B60N 3/004 | 248/447.1 |
| 2016/0257404 A1 * | 9/2016 | Ferris | B64D 11/00152 | |

\* cited by examiner

APPARATUS FOR SUPPORTING A PORTABLE DEVICE FOR SEAT BACK VIEWING

TECHNICAL FIELD

This specification relates to an apparatus for holding a portable device, and, more specifically, to an apparatus for holding a portable electronic device to a seating apparatus.

BACKGROUND

With the ever-increasing globalization and digitization of society, many individuals find themselves relying on portable electronic devices and rapid transit systems for personal and business purposes. Portable electronic devices enable electronic communication, data processing, and multimedia entertainment—along with many other activities—in a wide array of form factors. For example, a user might choose to watch a movie, read a book, or compose a message on the same device during a trip. But the user's experience while doing these activities can be substantially hindered by many factors such as the movement of the transit vehicle, the limited range of viewing angles available for the portable electronic device's display, and the available space to use or manipulate the portable electronic device. Further, while smart phones and tablet computing devices can fit neatly into the palm of a user's hand or on a user's lap, constantly holding a device or articulating one's body to see a display can quickly fatigue the user.

Existing apparatuses contain portable electronic devices through a variety of means. For example, some device cases simply include a stand or improvised stand to allow the device to sit erect on a horizontal surface. However, due to the lack of stable horizontal surfaces, large potential for movement, and the limited space available on many transit systems, such stands are impractical or nonexistent for use on mass transit systems. Further, many of these apparatuses conform to one size or design of device, for example a four-inch smart phone or a ten-inch tablet, and are unusable with other device form factors. Some apparatuses rely on fasteners, such as magnets, hook-and-loop materials, hangers, or suction devices; however, these too are impracticable on transit systems. These fasteners rarely adhere to surfaces, and even when they do adhere, the interface is insecure. Magnets do not fasten to nonferrous surfaces; hook-and-loop materials do not adhere to smooth or hard surfaces; hangers need to be sized for the surface to hang from and may intrude into another individual's space; and suction devices will not work properly without a sufficiently smooth surface. Other apparatuses grip the device with pressure, but this pressure can be too weak—resulting in the device disconnecting from the holder, potentially damaging the device in a fall—or too strong—resulting in damage to the device directly or the apparatus itself Further, many of these apparatuses are simply too large, cumbersome, or complicated to carry around or to function in the confined space available to the user and other transit system users.

Thus, there is a need for an apparatus that provides a simple, form-flexible design or method for using a portable electronic device. The present invention addresses this need.

SUMMARY

In certain aspects, the present invention provides an apparatus for seatback viewing of portable electronic devices. In accordance with some forms of the present invention, such apparatuses are configured to be secured to a seatback by a seatback tray table. Accordingly, in one embodiment, the present invention provides a back member; at least one connecting member operably connected to the back member; a bottom rest connected to the back member; a set of side members connected to the back member; a cavity defined by the back member, the bottom rest, and the set of side members; and at least one fastening member attached to the back member. In some further embodiments, the apparatus can also have an adjusting member, at least one opening through the back member, the at least one connecting member can contain at least one latching space, the at least one fastening member can be removed, at least one bottom interface, and/or at least one bottom interface opening. Further, in some embodiments the set of side members can be integrated with the bottom rest to form a set of integrated side members, the at least one connecting member can be removed from the back member, the cavity can function as an angle adjustment point, the adjusting member can be comprised of magnetic material, the set of integrated side members can attach behind the back member, and/or the set of integrated side members can attach to itself, In a further aspect, the present invention provides a method for seatback viewing of portable electronic devices. In accordance with some forms of the invention, such methods are secured to a seatback by a seatback tray table. Accordingly, in one embodiment, the present invention provides the steps of opening a seatback tray table; placing a connecting member between a seatback and the seatback tray table; closing the seatback tray table to sandwich the connecting member between the seatback and the seatback tray table; and attaching a portable electronic device with a fastening member to a back member operably connected to the connecting member. Further, in some embodiments of the method, the method can further comprise the steps of adjusting the angle of the back member by adjusting an adjusting member, forming a bottom rest, and/or attaching the connecting member to the back member. Some other embodiments further comprise the steps of folding a first set of side members and a second set of side members to be perpendicular to the back member, folding the second set of side members to be perpendicular to both the back member and the first set of side members, integrating the first set of side members and the second set of side members with the bottom rest to form an integrated set of side members, and/or attaching the integrated set of side members behind the back member.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

As used in the specification and the claims, the singular forms "a," "an," and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance occur in many instances, but not necessarily in all instances, and that the description includes instances where said event or circumstance occurs and instances where it does not.

Referring to FIGS. 1-8, a first embodiment of the present novel technology is illustrated, an apparatus 100 for supporting a tablet or the like for viewing on a seat back, including a generally flat and typically rectangular back member 110, one or more apertures 120, one or more elongated connecting members 130, a cavity or partially enclosed shelf 140, an elongated bottom rest member 150, one or more elongated side members 155, each typically having at least a first side member portion 160 and a second side member portion 170, and one or more typically elongated fastening members 180. The back member 110 may have one or more apertures 120 formed therethrough or inserted therein, through which one or more connecting members 130 may extend. The cavity 140—typically bounded by the bottom rest 150 and the one or more side members 155 that are typically oppositely disposed—is formed at the base of the apparatus 100. The cavity 140 provides a containment area for the user's portable electronic device (not shown), and the bottom rest 150 provides a ledge or support member to distribute the weight of the user's portable electronic device and to prevent accidental dropping of the user's device from the apparatus 100 and/or to provide protection from impact.

Figure 7:
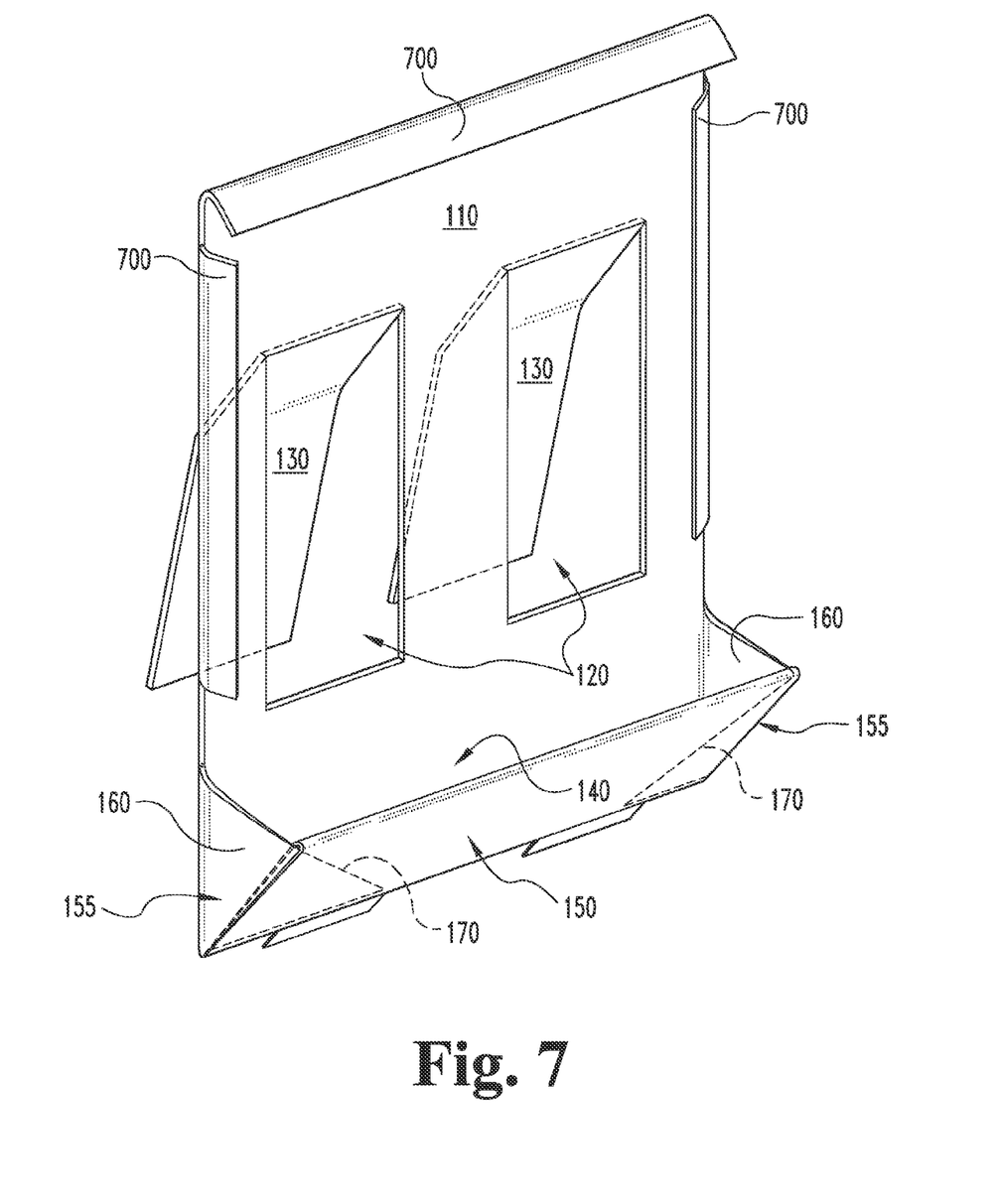
FIG. 7 is a perspective view of the embodiment of FIG. 1 apparatus with peripheral members.

Further, in some implementations, the bottom rest 150, the one or more side members 155, and/or one or more peripheral members 700 that may overlap the portable electronic device may define a sleeve enclosure having a viewing aperture through which the user may view his or her portable electronic device. For example, peripheral members 700 as top or side folds may add borders of overlapping material around the frame of the portable electronic device (the area inside the frame of the peripheral members 700 and the bottom rest 150 defining the viewing aperture). In some embodiments, these peripheral members 700 may add further structural stability to the apparatus 100 and act as a primary or supplemental fastening member 180.

In some alternate embodiments, the one or more side members 155 may further include at least a first side member portion 160 and a second side member portion 170. One example embodiment for the formation of the cavity 140 with the bottom rest 150, the first side member portion 160, and the second side member portion 170 is described in greater detail in FIG. 2. Finally, the one or more fastening members 180 are wrapped around the apparatus 100 to hold a user's portable electronic device securely to the apparatus 100.

In some alternative embodiments, the back member 110 is braced or otherwise reinforced to maintain structural stability that may otherwise be lost due to the one or more apertures 120. Further, in some embodiments, the one or more connecting members 130 may be formed by attaching, either permanently or removably, one or more connecting members 130 with a variety of connection methods including, but not limited to, joints, adhesives, molding, fasteners, or any other suitable means of attaching the one or more connecting members 130 to the back member 110. Further, in some implementations, the back member 110 may be made of a variety of materials including, but not limited to, cardboard, metal foil, fabric, plastic, or any other suitable lightweight and readily disposable structural material. The back member 110 may also be coated with a frictional coating, including, but not limited to, nonslip rubber or like films. The back member 110 material is typically rigid, but may be semi-rigid or nonrigid, in some embodiments.

Figure 1:
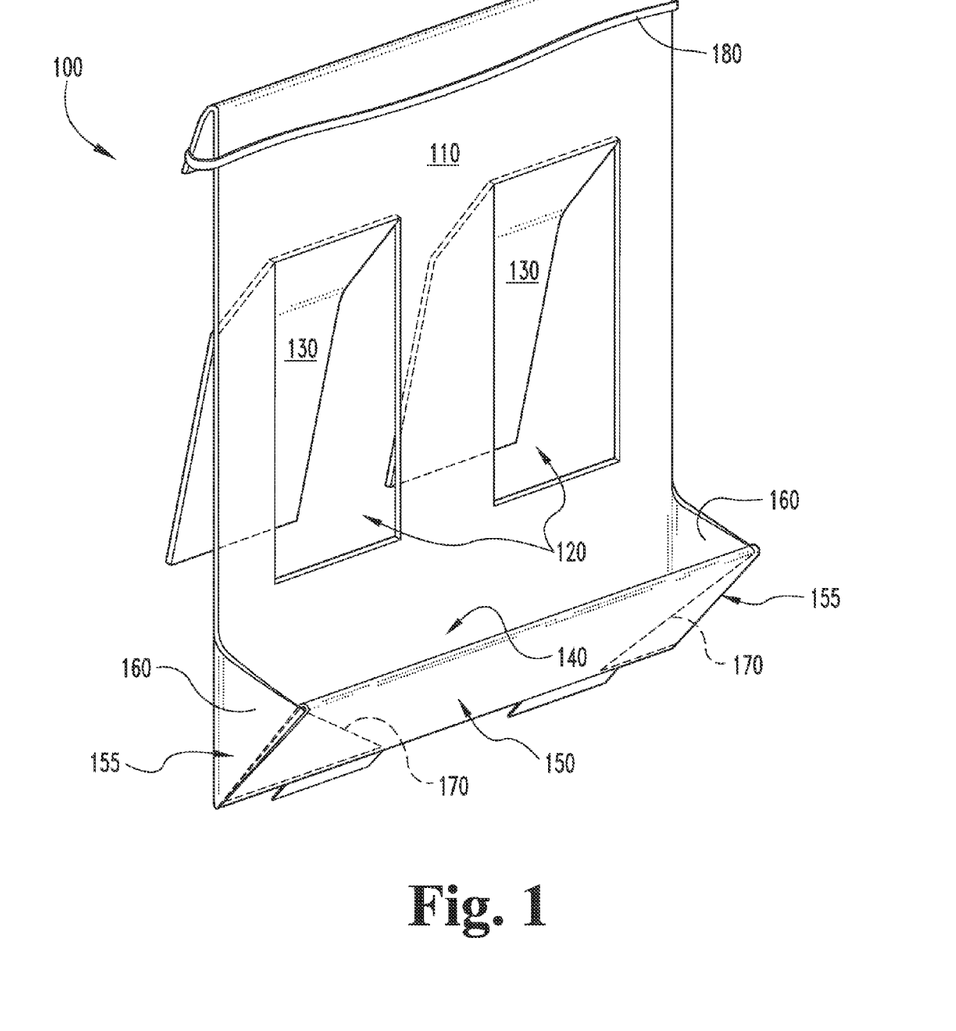
FIG. 1 is a perspective view of a first embodiment of the present novel technology, an apparatus for supporting a tablet on a seat back.

In some implementations, the bottom rest 150 may also be used as a primary or auxiliary angle adjustment point for articulating the user's portable electronic device. For example, the bottom rest 150 may be coated with a frictional material, lined with ridges, or otherwise inset to adjustably receive the user's portable electronic device at varying points.

The one or more fastening members 180 may be made of materials selected from rubber, polymers, fabric, metal foil, or any other like suitable structural material for fastening the user's portable electronic device to the apparatus 100. Further, while FIG. 1 shows the one or more fastening members 180 horizontally located at the top of the apparatus 100, the one or more fastening members 180 could likewise be located vertically, on the sides, at the corners, at the bottom, and/or at any other location suitable for retaining the user's portable electronic device. Finally, in some implementations, the one or more fastening members 180 may be an optically transparent and/or electrically conductive material such as, but not limited to, a film.

Typically, the apparatus 100 may be made of one or more disposable and/or recyclable materials, and the user of the apparatus 100 may dispose of the apparatus 100 after usage. Further, typically the apparatus may be created, formed, and/or sold as a single panel including the back member 110, the one or more apertures 120, the one or more connecting members 130, the cavity 140, the bottom rest 150, and the one or more side members 155. For example, in some typical embodiments, the apparatus 100 may initially be a single, flat cardboard panel with predefined manipulation locations on the panel including, but not limited to, perforations, fold lines, scoring, creases, and combinations thereof.

The panel may also have instructions printed, stamped, formed, or otherwise appearing on the panel to aid in manipulation. In one instance, a customer may buy the panel from an airline store or kiosk; follow the instructions and manipulating the predefined manipulation locations to punch out, tear, fold, crease, or otherwise modify the flat panel into the form of the apparatus 100; open a seatback tray table 310 from a seatback 300; place the one or more connecting members 130 of the apparatus 100 between the seatback 300 and the seatback tray table 310; close the seatback tray table 310, securely holding the one or more connecting members 130 between the seatback 300 and the seatback tray table 310; latch a seatback tray table latch 320; adjust the angle of the apparatus 100 with an adjusting member 500; place his or her portable device into the apparatus 100; and secure the portable device to the apparatus 100 with the one or more fastening members 180, which might be a rubber band or any other suitable structural material for fastening the portable device to the apparatus 100. Typically, once the flight or train ride is over, the user may discard or recycle the apparatus 100, although the user may also unfold the apparatus 100 and retain the used apparatus 100 for future transit. This affords a user an economical, lightweight, space-efficient, and/or disposable/recyclable option for holding and viewing his or her portable device during the transit period.

Figure 2:
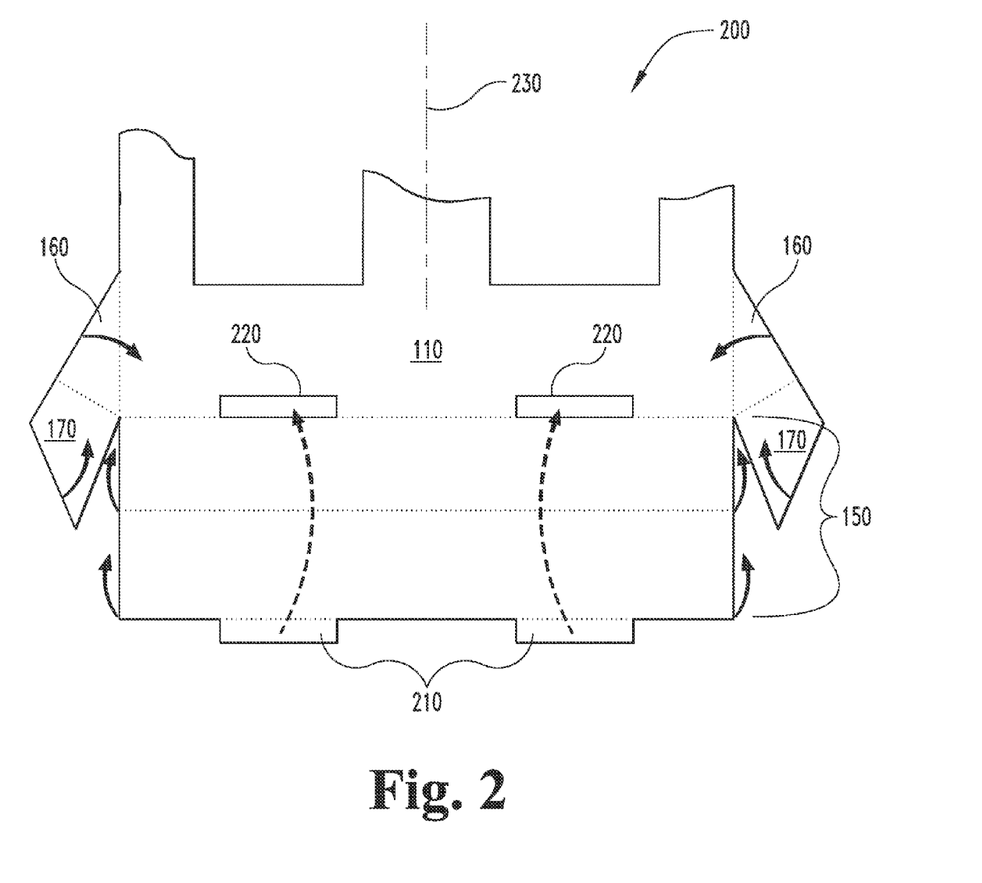
FIG. 2 is a perspective view of the bottom portion of the embodiment of FIG. 1.

One embodiment of the apparatus bottom portion 200—that is, roughly the area around FIG. 1's cavity 140 and bottom rest 150—includes a back member 110, a one or more typically oppositely disposed side members 155 having a first side member portion 160 and a second side member portion 170, a bottom rest 150, one or more bottom interfaces 210, and one or more bottom interface openings 220. A cavity 140—bounded and defined by the back member 110, the one or more side members 150, and the bottom rest 150—is formed at the apparatus bottom portion 200. The one or more side members 155 are folded toward the vertical center 230 of the back member 110 until both the first side member portion 160 and the second side member portion 170 are approximately perpendicular with the back member 110. This will essentially give the appearance of vertical rails on the sides of the apparatus 100. The second side member portion 170 is then again folded towards the vertical center 230 of the back member 110 until the second side member portion 170 is approximately perpendicular to both the back member 110 and the first side member portion 160. This will essentially result in a ninety-degree angle between the first side member portion 160 and the second side member portion 170. The bottom rest 150 is then folded towards the back member 110 and over the second side member portion 170 to securely enclose (sandwich) the second side member portion inside the bottom rest 150. Finally, the one or more bottom interfaces 210, which is located on the bottom rest 150, is securely pressed through the one or more bottom interface openings 220.

The material for the one or more side members 155 and the bottom rest 150 are typically at least semi-rigid to form the cavity 140; however, they need not all be made of the same material. For example, the one or more side members 15 may be made from a semi-rigid sheet, mesh, or other composition of a structural material such as stiff paper, cardboard, corrugated cardboard, coroplast, plastic, metal, fabric, or otherwise suitable rigid or semi-rigid material, while the bottom rest 150 may be a more rigid material, such as plastic with rubber coating.

Figure 6:
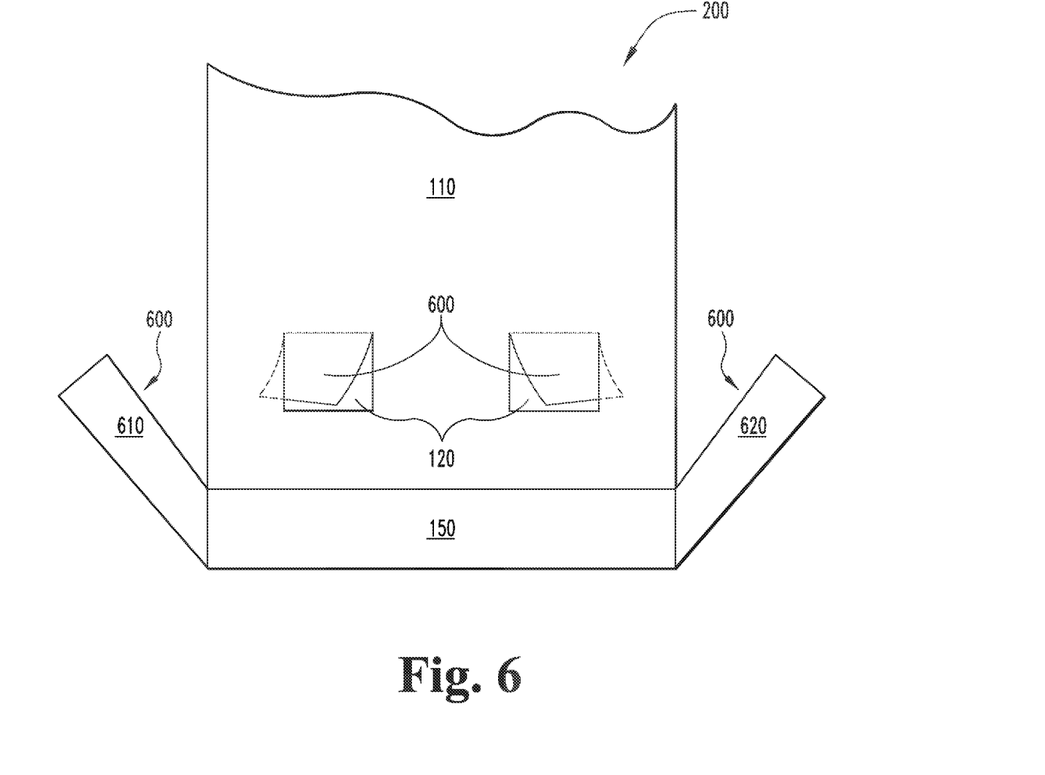
FIG. 6 is a perspective view of the embodiment of FIG. 1 with integrated side members.

In some alternative embodiments, the apparatus bottom portion 200 may be formed by wrapping one or more members from the front 400 of the apparatus 100 to the back 410 of the apparatus 100. For example, instead of using the first side member portion 160 and the second side member portion 170, the bottom rest 150 may include one or more integrated side members 600. As the bottom rest 150 material is folded upwards, the one or more integrated side members 600 may wrap around the sides of the apparatus 100 and attach to the back 410 of the apparatus 100. In some implementations, additional apertures 120, fastening members, tabs 610, or other suitable attachment means may attach the one or more integrated side members 600 to the back 410 of the apparatus 100. Further, in some implementations, the one or more integrated side members 600 may have self-contained means for attachment. For example, using a hook-and-loop fastener system, the one or more integrated side members 600 may have a first integrated side member 610 and a second integrated side member 620, and the first integrated side member 610 may have a hooked patch and the second integrated side member 620 may have the looped patch. When the first integrated side member 610 and the second integrated side member 620 intersect at the back 410 of the apparatus 100, each integrated side member may attach to each other, securely forming the cavity 140 of the apparatus bottom portion 200 and the bottom rest 150. Such a method would potentially increase structural stability of the apparatus 100 and/or result in easier assembly for the user. Further, depending on the degree to which the one or more integrated side members 600 are placed behind the apparatus 100, additional angle adjustment of user's portable electronic device may be achieved and/or the bottom rest 150 itself may be used as a means to apply pressure (and thus help hold) the user's portable electronic device to the apparatus 100.

Figure 3:
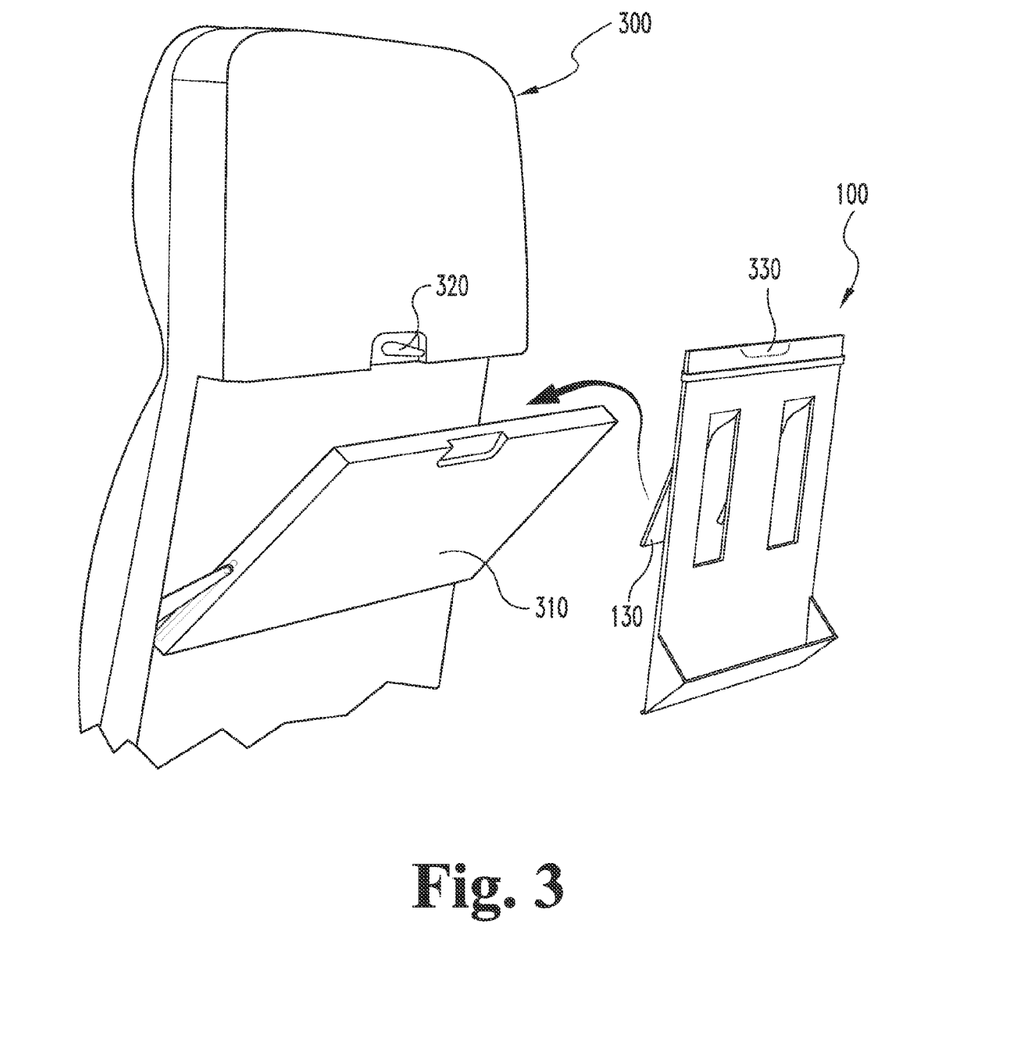
FIG. 3 is a perspective view of the embodiment of FIG. 1 in proximity to a seatback.
Figure 5:
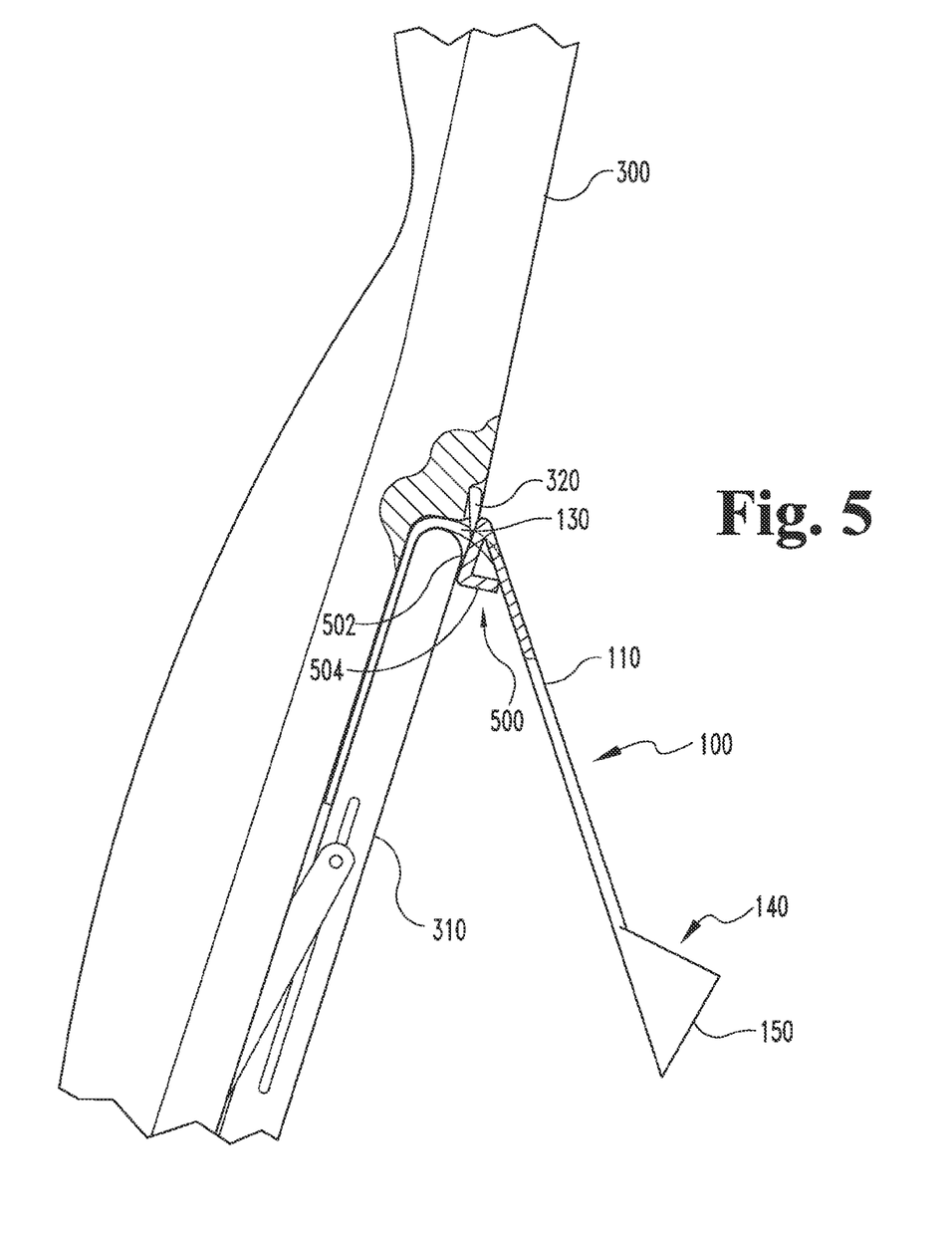
FIG. 5 is a perspective view of the embodiment of FIG. 1 connected to a seatback.

One embodiment of the apparatus 100, with one or more connecting members 130, is shown in proximity with a seatback 300, a seatback tray table 310, and a seatback tray table latch 320. A user would first open the seatback tray table 310 by unlatching the seatback tray table latch 320. The user would then take the apparatus 100 and place the one or more connecting members 130 between the seatback 300 and the seatback tray table 310. To secure the apparatus 100 in place, the user would then close the seatback tray table 310 and relatch the seatback tray table latch 320, securely holding the one or more connecting members 130 between the seatback 300 and the seatback tray table 310. Such a securely held state is shown in FIG. 5 and described later in this application.

In some embodiments, the one or more connecting members 130, the back member 110, and/or an adjusting member 500 may have one or more areas of free space or latching space 330 so that the seatback tray table latch 320 may fully close. While this is not necessary with some materials that may be used for the one or more connecting members 130—such as a thin, resilient plastic film which would still allow the seatback tray table latch 320 to securely close—it may be helpful for thicker materials that would otherwise interfere with the seatback tray table latch 320 operation. Such thicker materials might be used to better fill the gap between the seatback 300 and the seatback tray table 310. Such an unobstructed closure would result in a more secure attachment.

Further, in some implementations, the one or more connecting members 130 may be made of a rigid material which may act as both a rigid support that need not be securely held between the seatback 300 and the seatback tray table 310 or as a stand for horizontal surfaces if the user should wish to use such horizontal surfaces in a more spacious environment—for example, in a first-class cabin, when waiting in a transit terminal, or when using the device on a table in a coffee shop. Such an implementation would eliminate the need to carry multiple cases and/or stands for the same device, which would be very helpful for travelers enduring luggage size and/or weight restrictions.

Figure 4:
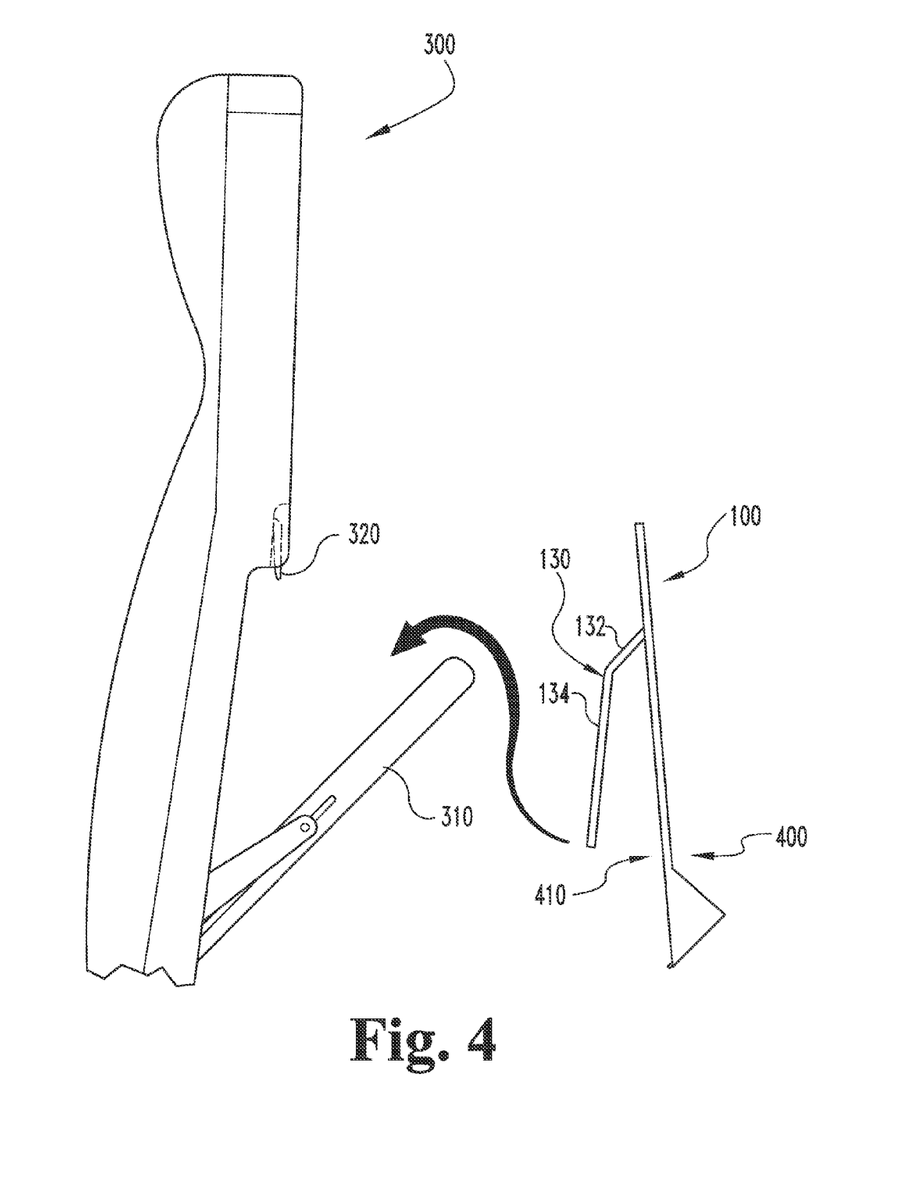
FIG. 4 is a side view of one embodiment of the embodiment of FIG. 1 and a seatback.

One embodiment of the apparatus 100 is shown in FIG. 4, with one or more connecting members 130, is shown from a side view in proximity with a seatback 300, a seatback tray table 310, and a seatback tray table latch 320. This embodiment shows how the one or more connecting members 130 extending from the apparatus 100 would fit between the seatback 300 and the seatback tray table 310 as described above with respect to FIG. 3.

Further, FIG. 4 shows another possible implementation of the one or more connecting members 130. The one or more connecting members 130 are segmented with a bend. This segmentation may allow for different materials to be used for each segment—for instance, a lower segment 132 and an upper segment 134—or part, meaning that the user or designer may choose which materials work best for their particular application. For example, the lower segment 132 might be thicker to account for the gap between the seatback 300 and the seatback tray table 310—perhaps due to an inset dining surface on the seatback tray table 310) while the upper segment 134 might be made thinner to more easily pass through a thin joint that might surround the seatback tray table 310. This segmentation and/or combination of materials may likewise be applied to other parts of the apparatus 100 as well. Further, a material might be selected to more rigidly hold the apparatus 100 and the user device at a preferred angle. For example, in some implementations a hinge or joint (such as a ball joint) may be used at the interface between the one or more connecting members 130 and the apparatus 100, thus allowing the user to articulate the apparatus 100 and their attached portable electronic device's display in a preferred angle or orientation.

Finally, one embodiment of the apparatus 100—comprised of a back member 110, one or more connecting members 130, a cavity 140, a bottom rest 150, and an adjusting member 500—is shown with a seatback 300, a seatback tray table 310, and a seatback tray table latch 320. The apparatus 100 is attached to the seatback 300 as the one or more connecting members 130 are securely held between the seatback 300 and the seatback tray table 310. In the embodiment of FIG. 5, the seatback tray table latch 320 is fully latched as well. The back member 110 extends downwardly from the interface between the top of the seatback tray table 310 and the seatback tray table latch 320. The angle of the apparatus 100 may be varied by making adjustments to the adjusting member 500, which is located between the back member 110 and the seatback tray table 310. The adjusting member 500 shown in FIG. 5 is made of rigid and/or semi-rigid materials, folded in segments 502 and 504, to yield a triangle. Depending on the desired angle, the user may increase or decrease the number of folds that were used to create the triangle. For example, if the triangle contains nine folds, making a triangle of three layers per side, the user could roll another fold onto the triangle to increase the angle between the back member 110 and the seatback tray table 310 or unroll a fold from the triangle to decrease the angle between the back member 110 and the seatback tray table 310.

In some embodiments, the adjusting member 500 may be created using a variety of materials and rolled into a variety of shapes. For example, the adjusting member 500 material may include, but is not limited to, magnets, hook-and-loop fasteners, or materials creating a highly attractive static charge (such as polyvinyl chloride or low density polyethylene plastic wrap), which may cause the layers to stick to themselves and resist unrolling. The shape of the adjusting member 500 may also have more or less sides—or be larger or smaller in size—depending on how finite of control is desired. Further, as described elsewhere in this application, the selection of materials and interfaces (such as a micro-hinge or other suitable interfaces) between parts of the apparatus 100 may allow the user to articulate the apparatus 100 and attached portable electronic device without the need for such an adjusting member 500. However, because a rolled adjusting member 500 is potentially less expensive and may lie flat against the apparatus 100, certain implementations may be selected for optimal benefit based on the situation.

Figure 8:
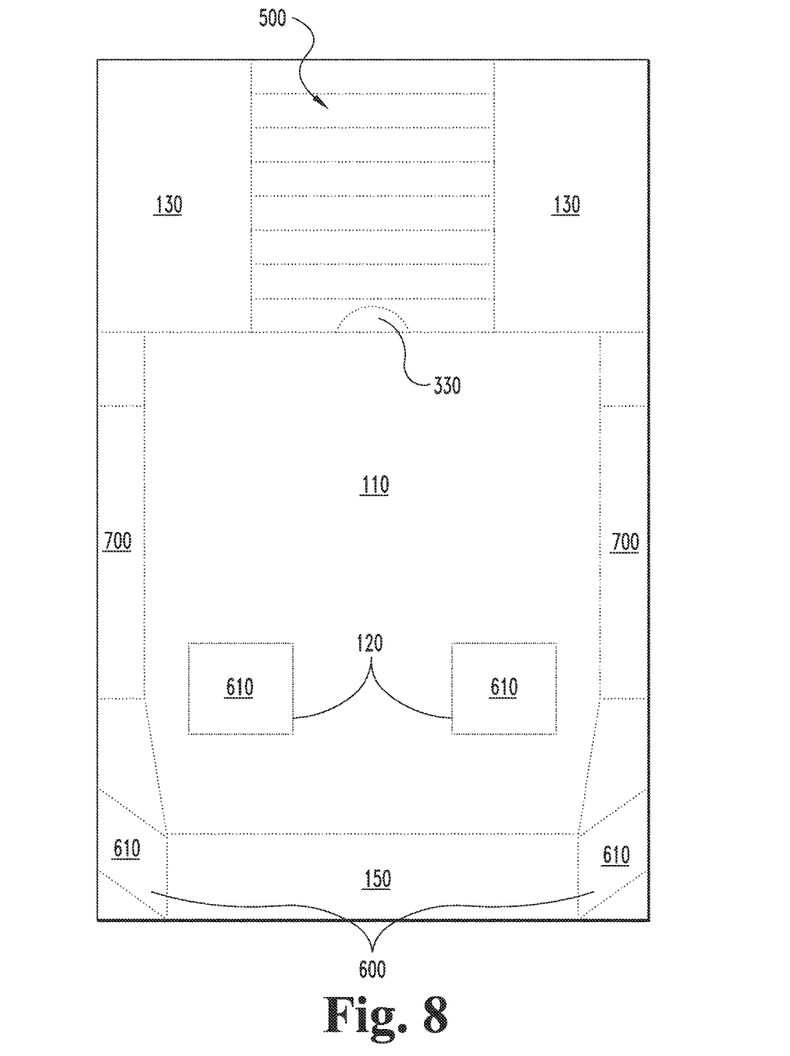
FIG. 8 is a perspective view of the embodiment of FIG. 1 in a flat panel with manipulation locations and manipulation location patterns.

Further, this selection may be used to create kits of components to assemble, partly or wholly, an apparatus for seatback viewing. Typically, such a kit may include a flat panel that the user would manipulate along manipulation locations and manipulation patterns—as shown in FIG. 8 as intermittent marks with one embodiment of the apparatus 100 in flat panel form—to yield the apparatus 100 and apparatus components—including, but not limited to, the back member 110, the one or more apertures 120, the one or more connecting members 130, the bottom rest 150, the one or more side members 150, and/or the one or more integrated side members 600. The embodiment shown in FIG. 8 includes, for example, a back member 110, apertures 120, connecting members 130, a bottom rest 150, a latching space 330, an adjusting member 500, integrated side members 600, tabs 610, and peripheral members 700 in the form of side folds. The panel may be made of any suitable, light-weight structural material, including, but not limited to, cardboard. In some embodiments, kits might include a sheet of flat, foldable magnetic segments, allowing for low space consumption but limited adjustability, whereas other kits might include one or more rigid connecting members which then connect with to a back member with a miniature hinge or joint (such as a ball joint), enabling greater control of articulation but increasing the size and/or cost of such a kit. Further, materials could be selected based on the amount of free space available on the transit. For example, a person on a train might have more space than a person in an airplane's economy class, which may allow the person on the train to use a design that protrudes further from the seatback and potentially offers a greater range of articulation.

Figure 9A:
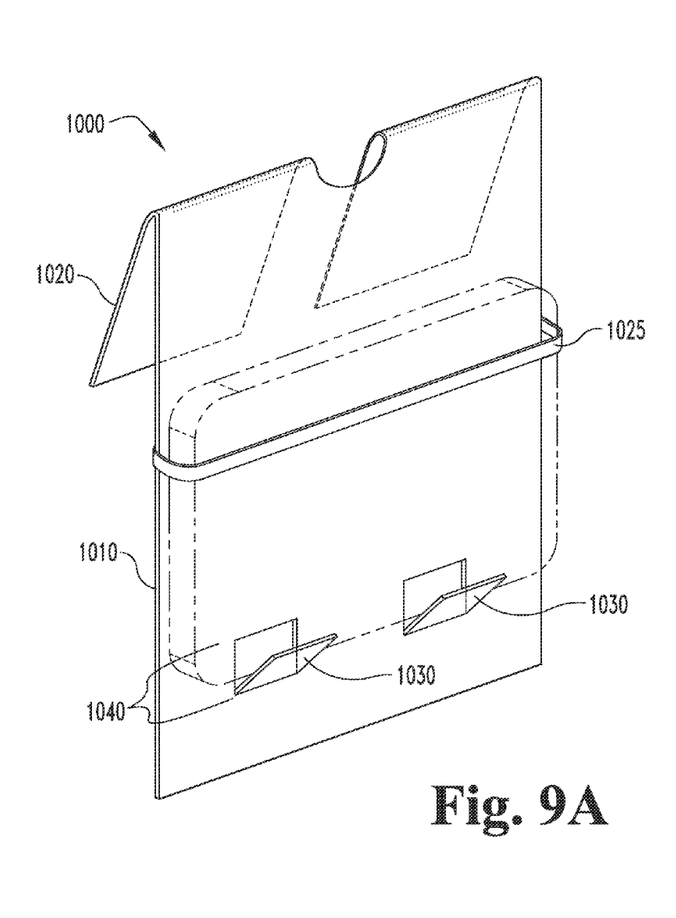
FIG. 9A is a perspective view of a second embodiment of the present novel technology.
Figure 9B:
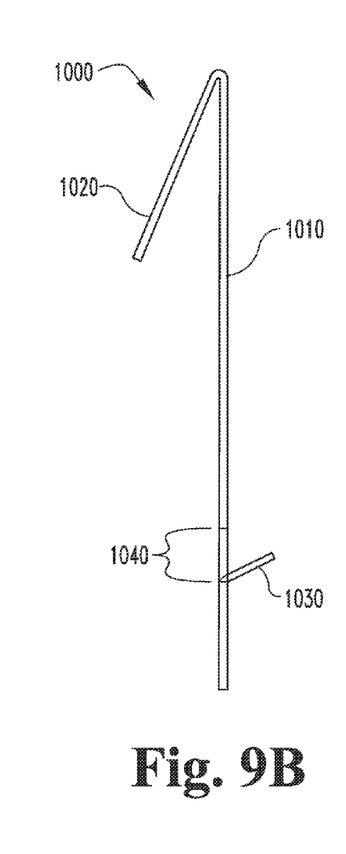
FIG. 9B is a side elevation view of the embodiment of FIG. 9A.

FIGS. 9A and 9B illustrate yet another embodiment of the present novel technology, an apparatus 1000 for supporting a tablet or the like for seatback viewing, and having a first generally flat portion 1010, at least one and more typically two seat pocket-engaging flap portions 1020 connected to the first generally flat portion 1010 at joint(s) 1025 and extending therefrom, and at least one and more typically two tablet-engaging flap portions 1030 connected at joint(s) 1035 to the extending from the first generally flat portion 1010 and extending therefrom. Flap portions 1020 extend from an edge of first generally flat portion 1010 and are typically pivoted to extend away therefrom in a first direction, while flaps 1030 are typically spaced away from the edges of the first generally flat portion 1010 and flap(s) 1020 and extend in a direction opposite flaps 1020 to define a support shelf 1040 for a tablet. Typically, apparatus 1000 is made of stiff cardboard or the like and joints 1025 and 1035 are formed and defined by bending flaps 1020 and 1030 away from first generally flat portion 1010.

Figure 10A:
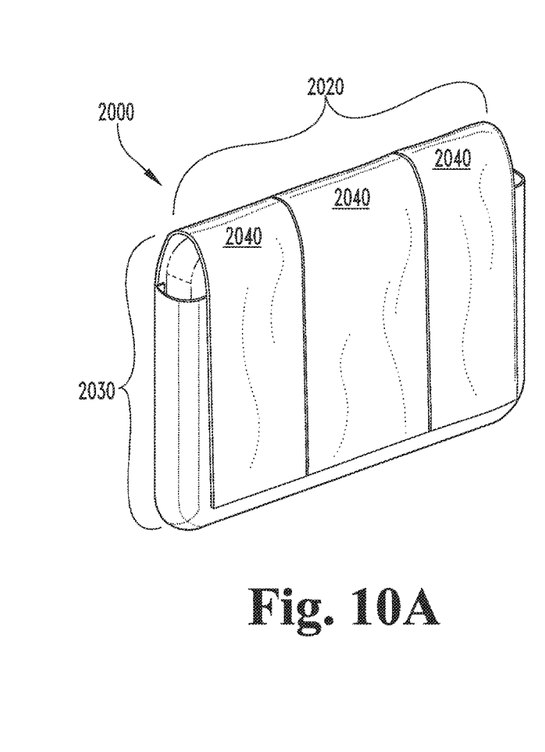
FIG. 10A is a perspective view of a third embodiment of the present novel technology.
Figure 10B:
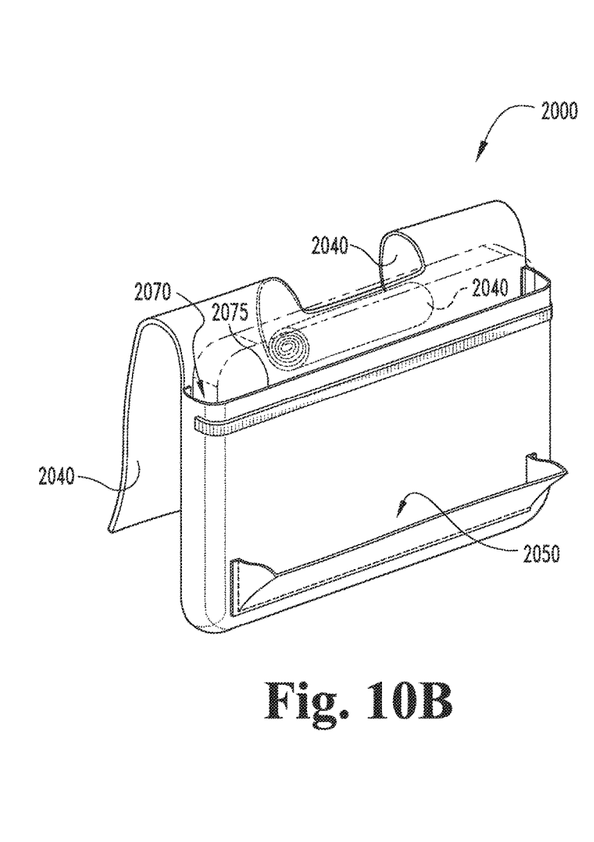
FIG. 10B is a second perspective view of the embodiment of FIG. 10A.

FIGS. 10A and 10B illustrate still another embodiment of the present novel technology, an apparatus 2000 for supporting a tablet or the like for seatback viewing, and having a flexible sheet 2010 of material, such as fabric, defining a first generally flat seat engaging portion 2020 connected to and extending from a second generally flat tablet engaging portion 2030. Typically, first and second portions 2020, 2030 are formed from a single, contiguous sheet of material, but may alternately be formed from separate pieces of material and connected together, such as by sewing.

Seat engaging portion 2020 is typically defined by three separate flaps 2040 but may alternately be contiguous. Tablet engaging portion 2030 typically includes an elongated shelf or pocket portion 2050 extending therefrom and positioned opposite seat engaging portion 2020. Pocket portion 2050 is typically likewise made of flexible material, such as cloth or fabric, and is typically sewn to tablet engaging portion 2030. Tablet engaging portion 2030 typically includes elongated tablet securing portion 2060 connected to tablet engaging portion 2030 and positioned to engage the top portion of a tablet resting in pocket portion 2050. Securing portion 2060 may be an elastic or cloth band or strap, or other material, connected or sewn to tablet engaging portion 2030.

Typically, apparatus 2000 further includes a large tablet carrying pocket 2070 formed in tablet engaging portion 2030, with an aperture 2075 positioned near or adjacent to seat engaging portion 2020.

In operation, the seat engaging portion 2020 is extended and inserted into the pocket of a seat back, allowing the tablet engaging portion 2030 to hang therefrom. A tablet, such as removed from pocket 2070 or otherwise procured, is inserted into pocket 2050 and secured with securing portion 2060. The middle flap 2040 may be inserted into the seat back pocket, or may be rolled to provide a 'bump' for cushioning the tablet and/or providing a positioning angle therefore.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

I claim:

1. An apparatus for supporting a portable electronic device to facilitate seatback viewing, comprising:
   a generally flat back member;
   at least one elongated connecting member punched from the generally flat back member and extending away therefrom, wherein extension of the at least one elongated connection member from the generally flat back member defines at least one aperture through the generally flat back member;
   a bottom rest member operationally connected to the generally flat back member;
   at least one side member operationally connected to the generally flat back member; and
   at least one fastening member attached to the generally flat back member; wherein the generally flat back member, the bottom rest member, and the at least one side member are configurable to define a partially enclosed shelf, wherein the partially enclosed shelf is shaped to securely hold the portable electronic device;
   wherein the generally flat back member, the at least one elongated connecting member, the bottom rest member, and the at least one side member are made of a non-rigid structural material;
   wherein the apparatus includes a first configuration in which the generally flat back member, the at least one elongated connecting member, the bottom rest member, the at least one side member, and the at least one fastening member are portions of a single flat panel and are defined by patterns of manipulation locations in a single piece of cardboard;
   wherein the apparatus includes a second configuration in which the single flat panel is manipulated to form the at least one elongated connecting member, the bottom rest member, the at least one side member, the at least one fastening member;
   wherein, when in the second configuration, the at least one elongated connecting member is configured to be positioned between an airline seatback and a latched airline tray table;
   wherein, when in the second configuration, the at least one elongated connecting member is configured to a suspended weight of the apparatus and the portable electronic device engaged with the partially enclosed shelf.

2. The apparatus of claim 1, wherein the non-rigid structural material is cloth.

3. The apparatus of claim 1, further comprising:
   at least one latching space formed in the at least one elongated connecting member.

4. The apparatus of claim 1, wherein the at least one side member is integrated with the bottom rest member to define at least one integrated side member.

5. The apparatus of claim 4, wherein the at least one integrated side member includes at least a first integrated side member and a second integrated side member and the first integrated side member and the second integrated side member are configured to interlock with each other.

6. The apparatus of claim 1, further comprising:
   an adjusting member attached to the generally flat back member.

7. The apparatus of claim 6, wherein the adjusting member is magnetic.

8. The apparatus of claim 1, further comprising:
   at least one peripheral member operationally connected to the generally flat back member, wherein the at least one peripheral member partially overlaps the portable electronic device.

9. The apparatus of claim 1, further comprising:
at least one bottom interface operationally connected to the bottom rest member; and
at least one bottom interface opening formed through the generally flat back member.

10. A recyclable hanging holder for supporting a portable electronic device to facilitate seatback viewing and formed from a single sheet of cardboard, comprising:
a back member, wherein the back member is generally flat;
at least one elongated connecting member punched from and extending from the back member;
a bottom rest member extending from the back member;
at least one side member extending from the back member; and
at least one peripheral member extending from the back member for engaging a portable electronic device;
wherein the back member, the bottom rest member, and the at least one side member are configurable to define a partially enclosed shelf;
wherein the back member, the at least one connecting member, the bottom rest member, and the at least one side member are flexible for the recyclable hanging holder to be lockingly engaged behind a latched airline tray table to hang therefrom;
wherein the recyclable hanging holder includes a first configuration in which the back member, the at least one elongated connecting member, the bottom rest member, the at least one side member, and the at least one peripheral member are portions of a single flat panel and are defined by patterns of manipulation locations in a single piece of cardboard;
wherein the recyclable hanging holder includes a second configuration in which the single flat panel is manipulated to form the at least one elongated connecting member, the bottom rest member, the at least one side member, the at least one peripheral member;
wherein, when in the second configuration, the at least one elongated connecting member is configured to be positioned between an airline seatback and the latched airline tray table;
wherein, when in the second configuration, the at least one elongated connecting member is configured to support a suspended weight of the recyclable hanging holder and the portable electronic device engaged with the partially enclosed shelf.

11. A suspension holder for supporting a portable electronic device to facilitate seatback viewing, comprising:
a back portion;
at least one elongated connecter portion punched from and extending from the back portion;
a bottom rest portion extending from the back portion;
at least one side portion extending from the back portion; and
at least one peripheral portion extending from the back portion;
wherein the back portion, the bottom rest portion, and the at least one side portion are configurable to define a partially enclosed shelf;
wherein the suspension holder includes a first configuration in which the back portion, the at least one elongated connector portion, the bottom rest portion, the at least one side portion, and the at least one peripheral portion are portions of a single flat panel and are defined by patterns of manipulation locations in a single piece of cardboard;
wherein the suspension holder includes a second configuration in which the single flat panel is manipulated to form the at least one elongated connector portion, the bottom rest portion, the at least one side portion, and the at least one peripheral portion;
wherein, when in the second configuration, the at least one elongated connector portion is configured to be positioned between an airline seatback and a latched airline tray table;
wherein, when in the second configuration, the at least one elongated connecting portion is configured to support a suspended weight of the suspension holder and the portable electronic device engaged with the partially enclosed shelf.

* * * * *